US012322365B2

(12) United States Patent
Blewett et al.

(10) Patent No.: US 12,322,365 B2
(45) Date of Patent: Jun. 3, 2025

(54) ENVIRONMENTALLY ADAPTIVE MASKING SOUND

(71) Applicant: Bose Corporation, Framingham, MA (US)

(72) Inventors: Mark Raymond Blewett, Framingham, MA (US); Chuan-Che Huang, Natick, MA (US); Daniel M. Gauger, Jr., Cambridge, MA (US); Jeremy Kemmerer, Holliston, MA (US); Xiao Quan, West New York, NJ (US); Berker Banar, London (GB)

(73) Assignee: Bose Corporation, Framingham, MA (US)

( * ) Notice: Subject to any disclaimer, the term of this patent is extended or adjusted under 35 U.S.C. 154(b) by 168 days.

(21) Appl. No.: 17/959,462

(22) Filed: Oct. 4, 2022

(65) Prior Publication Data

US 2024/0112661 A1 Apr. 4, 2024

(51) Int. Cl.
*G10K 11/175* (2006.01)
*H04R 1/40* (2006.01)
*H04R 3/00* (2006.01)

(52) U.S. Cl.
CPC ......... *G10K 11/1752* (2020.05); *H04R 1/406* (2013.01); *H04R 3/005* (2013.01); *H04R 2430/01* (2013.01)

(58) Field of Classification Search
None
See application file for complete search history.

(56) References Cited

U.S. PATENT DOCUMENTS

| | | | |
|---|---|---|---|
| 11,076,219 B2 | 7/2021 | Dutt et al. | |
| 2011/0046948 A1* | 2/2011 | Pedersen ............. | G10L 21/0208 704/E15.001 |
| 2012/0316869 A1 | 12/2012 | Xiang et al. | |
| 2020/0261687 A1* | 8/2020 | Kremer .................. | A61B 5/318 |
| 2020/0265824 A1* | 8/2020 | Kremer ............ | G10K 11/17885 |
| 2020/0312294 A1 | 10/2020 | Isberg et al. | |
| 2021/0241745 A1 | 8/2021 | Kremer et al. | |

OTHER PUBLICATIONS

Filipan et al., "A novel auditory saliency prediction model based on spectrotemporal modulations," Soundscape, Psychoacoustics and Urban Environment: Paper ICA2016-791, Buenos Aires, Sep. 5 to 9, 2016, 9 pages.
PCT International Search Report and Written Opinion for International Application No. PCT/US2023/034271, dated Jan. 19, 2024, 13 pages.

* cited by examiner

*Primary Examiner* — Harry S Hong
(74) *Attorney, Agent, or Firm* — Hoffman Warnick LLC

(57) ABSTRACT

Various implementations include adaptive masking of environmental sound. Particular implementations are configured to adjust a masking sound based on one or more detected environmental sound sources. An example method includes: measuring environmental sound proximate to an audio device, outputting a masking sound at the audio device, and adjusting at least one of: a volume of the masking sound, a spectrum of the masking sound, or content of the masking sound based on the measured environmental sound.

22 Claims, 5 Drawing Sheets

ENVIRONMENTALLY ADAPTIVE MASKING SOUND

TECHNICAL FIELD

This disclosure generally relates to audio devices and related approaches. More particularly, the disclosure relates to applying masking sounds in audio devices.

BACKGROUND

Masking sounds such as white noise, nature sounds, or chants have various beneficial applications. However, devices for applying conventional masking sounds fail to account for factors in the environmental sound around the user and can fail to provide adequate masking effects.

SUMMARY

All examples and features mentioned below can be combined in any technically possible way.

Various implementations include adaptive masking of environmental sound. Particular implementations are configured to adjust a masking sound based on one or more detected environmental sound sources.

In some particular aspects, a method includes: measuring environmental sound proximate to an audio device, outputting a masking sound at the audio device, and adjusting at least one of a volume of the masking sound, a spectrum of the masking sound, or content of the masking sound based on the measured environmental sound.

In some particular aspects, an audio device includes: at least one electro-acoustic transducer; a set of microphones; and a controller coupled with the at least one electro-acoustic transducer and the set of microphones, the controller configured to: measure environmental sound proximate to the audio device, output a masking sound to the at least one electro-acoustic transducer, and adjust at least one of: a volume of the masking sound, a spectrum of the masking sound, or content of the masking sound based on the measured environmental sound.

Implementations may include one of the following features, or any combination thereof.

In certain implementations, the method further includes determining at least one of the volume of the masking sound, the spectrum of the masking sound, or the content of the masking sound based on a model of environmental sound. In particular cases, the model of environmental sound includes a machine learning model, a saliency model, and/or a linear blind source separation model. In some aspects, the model of environmental sound includes a single model or multiple models.

In particular implementations, the method further includes training the model using at least one of a database of environmental sound inputs or a database of instrument and synthesizer sounds.

In some aspects, the model is periodically updated based on the measured environmental sound at the audio device.

In certain cases, the volume of the masking sound is determined based on a subset of frequencies in the measured environmental sound.

In particular aspects, the content of the masking sound is determined based on a subset of frequencies in the measured environmental sound.

In some implementations, the spectrum of the masking sound is determined based on a subset of frequencies in the measured environmental sound.

In some cases, the method further includes initiating a masking sound mode in response to a trigger prior to outputting the masking sound, wherein after initiating the masking sound mode, the volume of the masking sound, the spectrum of the masking sound, or the content of the masking sound is selected based on the measured environmental sound prior to outputting the masking sound.

In certain implementations, the trigger includes at least one of: a location-based trigger, a user profile trigger, user actuation at an interface connected with the audio device, detection of an acoustic signature in the environmental sound, proximity between the audio device and another device, or a scheduled time trigger. In particular cases, the scheduled time trigger is according to a user-defined schedule, a collaboratively suggested schedule based on a group of users, and/or a schedule developed by an artificial intelligence engine based on prior user trigger(s) and/or use pattern(s).

In some cases, the volume of the masking sound, the spectrum of the masking sound, or the content of the masking sound is selected to mask acoustic energy of at least one salient sound in the measured environmental sound.

In particular aspects, the volume of the masking sound is selected based on a sound pressure level (SPL) of at least one salient sound source in the measured environmental sound. In certain cases, the volume of the masking sound is selected to approximately match or exceed an upper range of the SPL of the salient sound source(s), or the volume of the masking sound is set to a defined level such as a defined value or percentage variation (e.g., +/−X decibels (dB) or +/−Y percent dB) from an upper range of the SPL of the salient sound source(s).

In certain cases, the SPL of the at least one salient sound is predicted using the measured environmental sound as an input to a model of environmental sound.

In some aspects, the method further includes: separating environmental sound sources in the measured environmental sound, identifying at least one salient sound source in the environmental sound sources, predicting a sound pressure level (SPL) for the at least one salient sound source using a model of environmental sound, and assigning the volume of the masking sound based on the predicted SPL for the at least one salient sound source.

In certain examples, salient sound sources can include one or more of: a child (e.g., baby) crying, one or more persons talking nearby, nearby road noise, an appliance or other repetitive machine noise, etc.

In particular cases, the selection of the masking sound is based on one or more characteristics of the salient sound source. For example, the frequency (in addition to, or alternatively to the volume) of the masking sound can be assigned based on the predicted SPL for the salient sound source(s). Further, the content and/or equalization (EQ) of content in the masking sound can be altered based on the spectrum of predicted salient sound source(s). In still further implementations, a masking model can be used to determine a preferred spectrum and/or SPL of the masking sound.

In certain aspects, the method further includes assigning the content of the masking sound based on the SPL for the at least one salient sound source. In particular cases, the masking sound can include multiple masking sounds, or, layers of masking sounds. For example, a first masking sound can be triggered by certain sound source(s) (e.g., speech), and a second masking sound can be triggered by another source (e.g., coffee machine). In various implementations, the content of the masking sound is based on an upper, lower, or mid-range SPL for the salient sound source, for example, a musical note can be generated at a mid-range or low-range SPL as a masking sound for salient sound sources.

In some cases, assigning the volume of the masking sound includes applying a volume margin above the predicted highest SPL.

In particular implementations, the sound sources are identified using a source separation model that accounts for sound spectro-temporal modulations. In certain cases, environmental sound sources can include salient sound, but do not necessarily include salient sound sources. For example, a source separation model can separate environmental sound into different stems, e.g., voice, appliance, ambient, etc., and based on the volume and/or content of the source(s), a volume and/or content of masking sound can be assigned and/or adjusted.

In certain aspects, the masking sound includes a sound that is intentionally audible to the user.

In some implementations, the masking sound is user selectable from a predefined group of masking sounds or is dynamically generated using a masking sound model.

In particular cases, the masking sound includes at least one of an audio track or an audio stream of audio content intended to mask at least one type of sound in the environmental sound. In some examples, the audio track or audio stream includes white noise, ocean sounds, forest sounds, rain sounds, etc. In certain examples, types of sound in the environmental sound can include sound sources and/or frequencies of sound (e.g., including multiple sources) in the environmental sound.

In certain aspects, the audio device includes a wearable audio device.

In particular cases, the wearable audio device includes an occluding wearable audio device or a non-occluding wearable audio device.

In some implementations, the wearable audio device includes an active noise reduction (ANR) audio device.

In certain cases, the method further includes: receiving feedback from a user to further adjust at least one of the volume of the masking sound, the spectrum of the masking sound, or the content of the masking sound, determining that the user intends to mask a distinct portion of the environmental sound based on the feedback, and adjusting at least one of the volume of the masking sound, the spectrum of the masking sound, or the content of the masking sound to mask the distinct portion of the environmental sound.

In particular implementations, the method further includes updating a model of environmental sound based on the feedback from the user.

In some cases, the method further includes saving the update to the model for use in future masking mode operation by the user or a group of users.

In certain aspects, the model is updated using a hysteresis factor attributable to the user or a group of users.

In some cases, the content of the masking sound is selected to mitigate detectability of looping artefacts in a repeating masking sound. For example, the content of the masking sound can be determined using generative music techniques to generate and/or modify the content of the masking sound.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
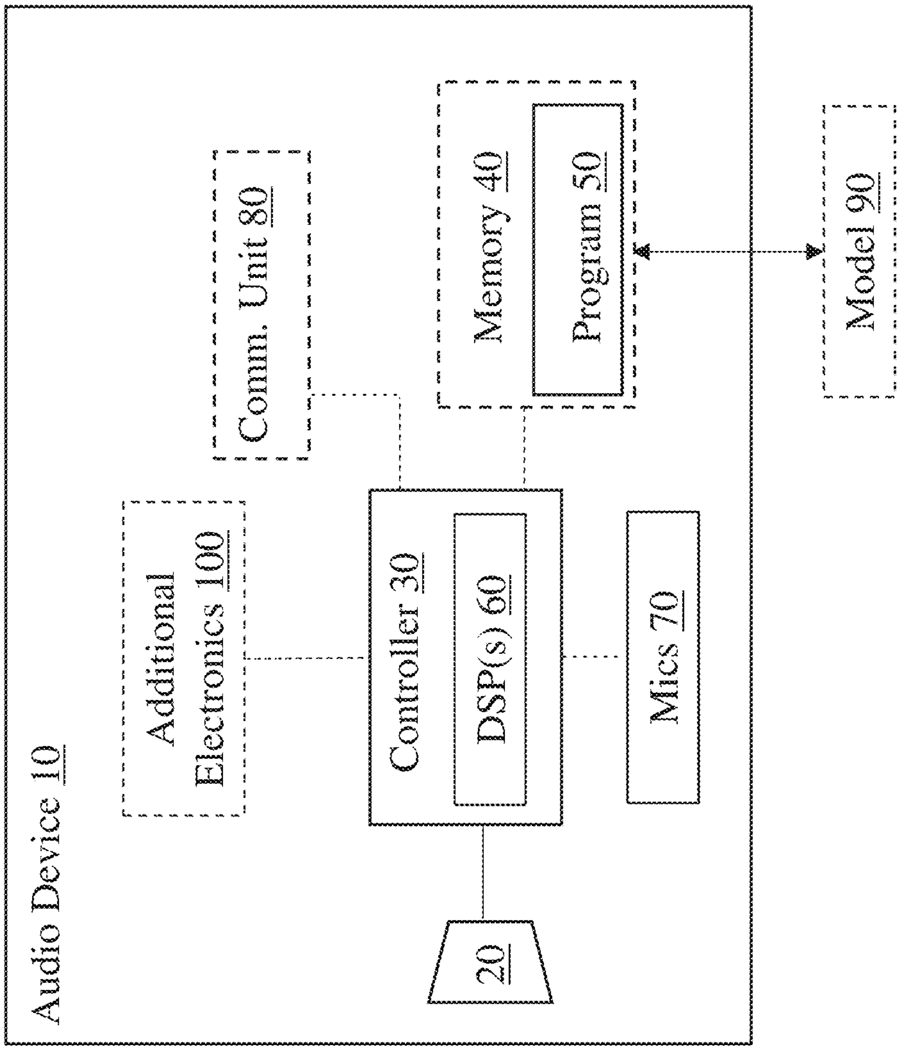
FIG. 1 is a schematic block diagram of an audio device according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that adapting masking sounds based on the acoustic environment can improve the user experience. For example, approaches can include measuring environmental sound proximate to an audio device (e.g., a wearable audio device), outputting a masking sound at the audio device, and adjusting the volume, spectrum, and/or content of the masking sound based on the measured environmental sound. In particular cases, the volume, spectrum, and/or content of the masking sound is determined based on a model of environmental sound.

The approaches disclosed according to various implementations can be employed in systems including wearable audio devices, fixed devices such as fixed installation-type audio devices, transportation-type devices (e.g., audio systems in automobiles, airplanes, trains, etc.), portable audio devices such as portable speakers, multimedia systems such as multimedia bars (e.g., soundbars and/or video bars), audio and/or video conferencing systems, and/or microphone or other sound pickup systems configured to work in conjunction with an audio and/or video system. In particular cases, the approaches disclosed according to implementations are suited for wearable audio devices, for example, wearable audio devices that are either occluding of the user's ear canal (providing passive noise cancelation), or non-occluding (also called "open-ear") of the user's ear canal. In more particular cases, the wearable audio device includes active noise reduction (ANR), such as deployed by an ANR circuit or circuits.

Commonly labeled components in the FIGURES are considered to be substantially equivalent components for the purposes of illustration, and redundant discussion of those components is omitted for clarity.

FIG. 1 shows an example of an audio device 10 according to various implementations. In certain cases, the audio device 10 is configured to provide an acoustic output to a user, e.g., a masking sound to a user. Examples of audio device 10 or components thereof include, but are not limited to, a headphone, a headset, a hearing aid device, an audio speaker (e.g., portable and/or fixed, with or without "smart" device capabilities), an entertainment system, a communication system, a conferencing system, a smartphone, a tablet, a personal computer, a vehicle audio and/or communication system, a piece of exercise and/or fitness equipment, an out-loud (or, open-air) audio device, a wearable private audio device, and so forth. Additional devices employing or otherwise integrating the audio device 10 can include a portable game player, a portable media player, an audio gateway, a gateway device (for bridging an audio connection between other enabled devices, such as Bluetooth devices)), an audio/video (A/V) receiver as part of a home entertainment or home theater system, etc. Specific, non-limiting examples of audio device 10 capable of deploying the various disclosed implementations include on-ear headphones, over-ear headphones, in-ear headphones (or, earbuds), near-ear headphones, wearable speaker systems (e.g., shoulder or head-worn speakers), or audio eyeglasses.

The audio device 10 is shown including one or more electro-acoustic transducer(s) 20 for providing an audio output. The transducer(s) 20 are connected with a controller 30, which can include one or more processors, or processor units. The controller 30 (e.g., processors therein) can be coupled with a memory 40 that stores a program (e.g., program code) 50 for performing masking sound control according to various implementations. In some cases, memory 40 is physically co-located with controller 30, however, in other implementations, the memory 40 is physically separated from the controller 30 and is otherwise accessible by the controller 30. In some cases, the memory 40 may include a flash memory and/or non-volatile random access memory (NVRAM). In particular cases, memory 40 stores: a microcode of a program (e.g., masking sound control program) 50 for processing and controlling the processor(s) in controller 30, and may also store a variety of reference data. In certain cases, the processor(s) in controller 30 includes one or more microprocessors and/or microcontrollers for executing functions as dictated by program 50. In certain cases, processor(s) in controller 30 include at least one digital signal processor (DSP) 60 configured to perform signal processing functions described herein. In certain cases, the DSP(s) 60 may be implemented as a chipset of chips that include separate and multiple analog and digital processors. In particular cases, when the instructions 50 are executed by the processor(s), the DSP 60 performs functions described herein. In certain optional cases, the controller 30 is also coupled a communication unit 80 in some cases, which can include a wireless (e.g., Bluetooth module, Wi-Fi module, etc.) and/or hard-wired (e.g., cabled) communication system. In additional cases, the controller 30 is coupled with one or more microphones 70, e.g., for detecting acoustic signals from the environment proximate to the audio device 10. In some cases, the microphone(s) 70 can include a feedback microphone and/or a feedforward microphone for use in detecting acoustic signals from the environment (also referred to as “environmental sound”). In particular cases, feedforward and/or feedback microphones can be used in a noise reduction approach, such as in an active noise reduction (ANR) approach deployed by the controller 30. In such cases, the controller 30 can include an ANR circuit for reducing noise in audio output to the user via transducer(s) 20.

As described herein, the audio device 10 can include (e.g., stored in memory 40), or can otherwise access, a data model 90. The data model 90 can include one or more data models used to calculate or otherwise determine characteristics (e.g., volume, content, etc.) of the masking sound for output to transducer(s) 20. In certain cases, the data model 90 includes a model of environmental sound, such as a data model representing acoustic characteristics of one or more sounds (and/or sources) in an environment. For example, the acoustic characteristics (e.g., frequency, equalization, spectrum) of sound sources such as appliances (e.g., HVAC systems, refrigerators, washer/dryer units), voices (e.g., babies crying), animal sounds (e.g., dogs barking, cats meowing), can be stored in data model 90, and used to identify and/or separate sounds or sound sources, as well as select appropriate masking sound characteristics (e.g., volume, content, frequency, etc.). In particular examples, the data model 90 includes one or more of: a machine learning model, a saliency model, and a linear blind source separation model.

In certain examples, the data model 90 includes a model of environmental sound, e.g., one or more sound sources from an environment. In particular cases, the audio device 10 or another device (e.g., connected smart device) is configured to train the model 90 using a database of environmental sound inputs and/or a database of instrument and synthesizer sounds. In some implementations, the database of environmental sound inputs includes data files (e.g., audio files) of environmental sound inputs captured (e.g., via microphones such as microphones 70), or data files of environmental sound inputs generated by a computing device that represent environmental sound sources. In certain cases, the database of instrument and synthesizer sounds includes environmental sounds that are generated by an instrument and/or synthesizer to represent particular sound sources, e.g., sources of sound such as machines, voices, traffic/road noise, etc. According to various implementations, the controller 30 is configured to train the model 90 (e.g., model of environmental sound) using the database of environmental sound inputs and/or the database of instrument and synthesizer sounds. In particular cases, the model 90 is trained over time using environmental sound inputs and/or instrument and synthesizer sound inputs to recognize particular sound sources and/or acoustic signature characteristics of sound in an environment. In certain aspects, the model 90 is periodically updated based on the measured environmental sound at the audio device 10. That is, the model 90 is updated (e.g., after training) to further refine the ability to recognize sound sources in environmental sound and/or detect new or changing sound sources in environmental sound.

As shown in FIG. 1, the audio device 10 can also include additional electronics 100, such as a power manager and/or power source (e.g., battery or power connector), memory, sensors (e.g., inertial measurement unit(s) (IMU(s)), accelerometers/gyroscope/magnetometers, optical sensors, voice activity detection systems), etc. Certain of the above-noted components depicted in FIG. 1 are optional, or optionally co-located with the transducer(s) 20, controller 30, and microphone(s), and are displayed in phantom.

Figure 2:
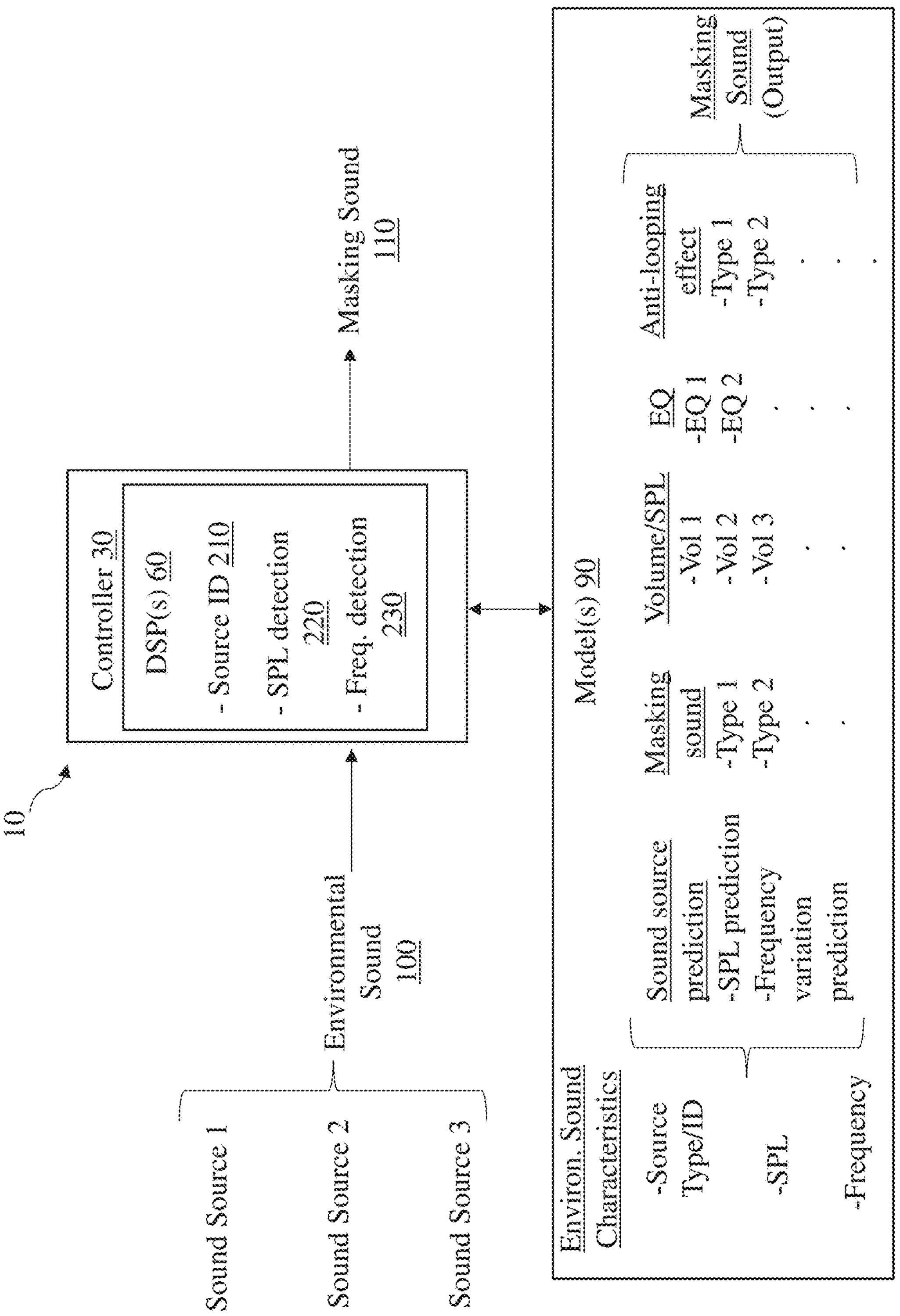
FIG. 2 is a data flow diagram illustrating aspects of an audio device according to various implementations.

FIG. 2 shows a schematic data flow diagram mapping environmental sound 100 (including one or more sound sources) to the audio device 10 which outputs a masking sound 110 based on that detected environmental sound 100. In some cases, the environmental sound 100 is composed of one, two, three, four, or numerous sound sources, a few of which are illustrated in FIG. 2 as Sound Source 1, Sound Source 2, and Sound Source 3. As described herein, the DSP(s) 60 at controller 30 can be configured to identify, categorize, group, and/or separate sound sources (e.g., Sound Sources 1, 2, 3, etc.) within environmental sound 100 to aid in adjusting the volume and/or content of the masking sound 110 according to various implementations. In certain cases, the DSP(s) 60 can include sub-components (or sub-circuits) for performing particular functions in analyzing environmental sound 100. For example, the DSP(s) 60 can include a source identifier 210, a volume (or SPL) detection component 220, and/or a frequency detection component 230. In various implementations, these components are configured to identify one or more sources in the environmental sound 100, detect a sound pressure level of one or more sources in the environmental sound 100, and/or detect a frequency of one or more sources in the environmental sound 100.

Figure 3:
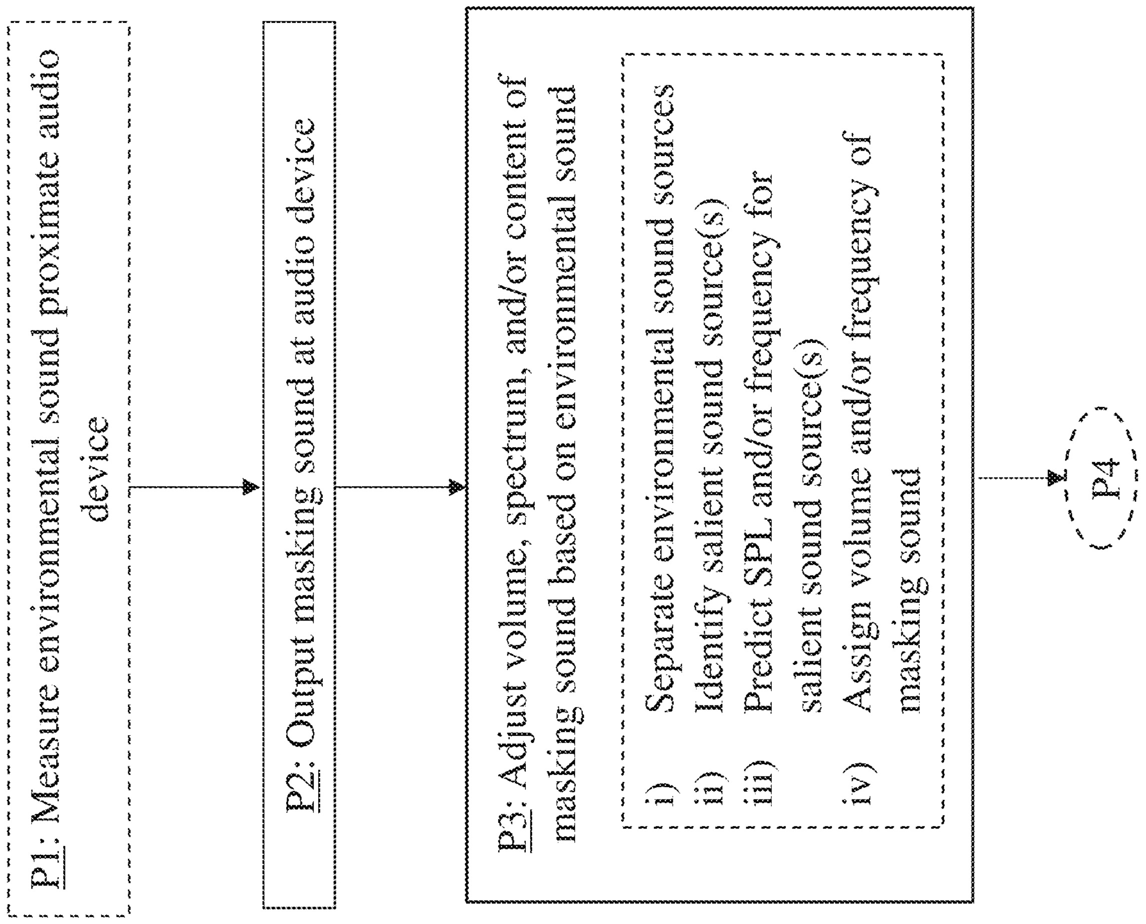
FIG. 3 is a flow diagram illustrating processes in a method performed according to various implementations.

FIG. 3 is a flow diagram illustrating a process performed by the audio device 10 (e.g., the controller 30) according to various implementations. FIGS. 1 and 2 are referred to concurrently with FIG. 3. It is noted that processes illustrated in FIG. 3 and otherwise described herein need not be executed in the order shown, and can be executed in any technically feasible order.

Turning to FIG. 3, a first process (P1) includes measuring environmental sound 100 proximate to the audio device 10. Process P1 is indicated in phantom as being optionally performed prior to outputting the masking sound (P2) in certain implementations, which is further detailed herein. In particular implementations, environmental sound 100 includes a mix of a plurality of sound sources (e.g., Sound Sources 1, 2, 3, etc.). However, environmental sound 100 can also include a single sound source, or a single detectable sound source. The environmental sound 100 is detected using microphone(s) 70, and the controller 30 can be configured to perform beamforming or other signal processing techniques to separate and/or locate sound sources within the environment.

With continuing reference to FIG. 3, a second process (P2) includes outputting a masking sound 110 at the audio device 10 (e.g., via transducer(s) 20). In certain cases, the masking sound 110 is automatically output in response to a trigger, e.g., a trigger detected at the audio device 10 or a connected device. In particular cases, the masking sound 110 is output as part of a masking sound mode that is initiated in response to one or more triggers. In some aspects, the masking sound mode is initiated in response to the trigger(s) prior to outputting the masking sound 110. In particular examples, the masking sound 110 is automatically output in response to one or more triggers described herein.

In some examples, the trigger includes at least one of: a location-based trigger (e.g., detection of the audio device 10 at a location), a user profile trigger (e.g., via control settings attributed to one or more users), user actuation at an interface connected with the audio device 10, detection of an acoustic signature in the environmental sound, proximity between the audio device 10 and another device (e.g., a noise-generating device), or a scheduled time trigger (e.g., during work hours, or a designated focus time). In particular cases, the scheduled time trigger is according to a user-defined schedule, a collaboratively suggested schedule based on a group of users, and/or a schedule developed by an artificial intelligence engine based on prior user trigger(s) and/or use pattern(s).

As noted herein, in certain examples, the masking sound 110 is automatically initiated based on measuring the environmental sound 100, e.g., in response to detecting a change in environmental sound 100 and/or an acoustic characteristic of the environmental sound 100. For example, the controller 30 at audio device 10 can be configured to automatically initiate a masking sound 110 in response to detecting a threshold SPL and/or acoustic signature (such as a type of noise) in an environment. Further, the controller 30 can be configured to automatically initiate a masking sound 110 in response to detecting a change in an acoustic characteristic in the environmental sound 100, e.g., that a user of the audio device 10 moves from a relatively quieter acoustic environment to a relatively louder acoustic environment, or that the characteristics of an acoustic environment change by a threshold (e.g., SPL, spectrum, frequency, etc.). It is further understood that any change in audio output from audio device 10 described herein can be performed automatically, e.g., without user input and/or intervention. That is, the audio device 10 (e.g., controller 30) can be configured to automatically adjust the audio output (such as masking sound 110 and characteristics thereof) without requiring user input and/or intervention, e.g., initiating or ceasing output of masking sound 110, changing a volume of the masking sound 110, changing a spectrum of the masking sound 110, and/or changing the content of the masking sound 110.

In particular cases, the masking sound 110 includes a sound that is intentionally audible to the user. That is, the masking sound 110 is differentiated from a noise cancellation signal intended to cancel environmental sound 100 without being audible to the user. In some implementations, the masking sound is user selectable from a predefined group of masking sounds. For example, a user interface at the audio device 10, or a user interface at a distinct device (e.g., a smart device, wearable smart device, laptop, tablet computer, etc.) can be configured to receive a user selection of a masking sound 110 from a predefined group of masking sounds. In further implementations, the masking sound 110 is dynamically generated using a masking sound model, which can be part of the data model(s) 90 described herein. In a particular example, the masking sound 110 includes at least one of an audio track or an audio stream of audio content intended to mask at least one type of sound in the environmental sound 100. In some examples, the audio track or audio stream includes white noise, ocean sounds, forest sounds, rain sounds, etc. In certain examples, types of sound in the environmental sound 100 can include sound sources and/or frequencies of sound (e.g., including multiple sources) in the environmental sound 100.

According to certain examples, the content of the masking sound 110 is selected to mitigate detectability of looping artefacts in a repeating masking sound. For example, a masking sound 110 can include a repeating sound of ocean waves, white noise variation, breeze passing through a forest, etc. In such cases, the repetitive nature of the masking sound 110 may be detectable by the user, e.g., the end of a track and/or beginning of the track can include an audibly detectable looping artefact. This looping artefact can be distracting or otherwise undesirable to the user. In various implementations, in cases where the masking sound 110 includes a repeating masking sound, the controller 30 is configured to select the content of the masking sound 110 to mitigate detectability of looping artefacts. For example, the content of the masking sound 110 can be determined using generative music techniques to generate and/or modify the content of the masking sound 110. Generative music techniques can include rule-based approaches for generating masking sounds (e.g., music), such as using a Markov chain, and/or machine learning-based (e.g., deep learning-based) approaches. Such techniques can disguise or otherwise smooth the looping artefacts in a masking sound 110.

In various implementations, after measuring the environmental sound 100 proximate to the audio device 10 (in process P1), and either before or after outputting any masking sound (process P2), the audio device 10 is configured in process P3 to adjust the volume and/or content of the masking sound 110 based on the measurement of the environmental sound 100. In various implementations, the process of adjusting the volume and/or content of the masking sound 110 is based on a determination of the desired or otherwise appropriate volume and/or content of the masking sound 110. In particular cases, the audio device 10 (e.g., controller 30) is configured to determine the volume and/or content of the masking sound based on the measured environmental sound 100. According to certain implementations, the volume and/or content of the masking sound 110 is selected to mask acoustic energy of at least one salient sound in the measured environmental sound 100.

In an example approach, the volume of the masking sound 110, the spectrum of the masking sound 110, and/or the content of the masking sound 110 is determined based on a model (e.g., data model 90) of environmental sound. In addition to volume and/or content (e.g., type of masking sound 110), the controller 30 can be configured to determine an equalization level for the masking sound 110, whether to include an anti-looping artefact, etc. FIG. 2 includes a data model illustrating non-limiting examples of characteristics in one or more model(s) 90, including inputs such as environmental sound characteristics and a masking sound output. In certain cases, environmental sound characteristics can include identified source(s) (e.g., from source identifier 210), sound pressure level (e.g., from SPL detector 220), and/or frequency (e.g., from frequency detector 230). The model(s) 90 can include a sound source predictor for prediction SPL and/or frequency variation of one or more sound sources. In a particular example, the sound source predictor is configured to predict a range of SPL for one or more sound sources, and/or a frequency variation for one or more sound sources. In certain cases, the sound source predictor is configured to predict an upper range and/or lower range of an SPL for a given sound source, or an upper and/or lower range of frequency for a given sound source. Based on the SPL and/or frequency prediction, the model 90 can select one or more types of masking sound (e.g., Type 1, Type 2, etc.), volume/SPL level (e.g., volume level 1, level 2, etc.), and/or equalization level (e.g., EQ level 1, EQ level 2, etc.) for the masking sound output. In certain cases, such as in response to selecting a masking sound (e.g., Type 2) with a repeating track or stream, the model 90 selects an anti-looping effect to mitigate detectable looping artefacts in the output. In various implementations, one or more of the selection categories is determined by the SPL prediction and/or frequency variation prediction. For example, the model can correlate one or more characteristics of the environmental sound with certain masking sound characteristics. In a particular example, the model 90 correlates a predicted SPL with a volume/SPL level of the masking sound output, and a predicted frequency variation with an equalization level of the masking sound output.

As further described herein, the controller 30 can be configured to use the model 90 in identifying salient sound sources in the environmental sound 100, predicting characteristics of those salient sound sources (e.g., SPL, frequency variation, etc.) using model 90, and determining a masking sound 110 to effectively mask that sound source (e.g., salient sound source). In certain implementations, the masking sound 110 is determined based on a predicted characteristic of the sound source that is likely to persist over a period, e.g., over an extended period such as a matter of several minutes, or even hours. That is, the controller 30 is configured to use the model 90 in determining a masking sound 110 that masks variations (e.g., in SPL, frequency, etc.) in the sound, e.g., salient sound, such that the output of the masking sound 110 need not be adjusted frequently. For example, the controller 30 can use the model 90 to determine a masking sound 110 that effectively masks environmental sound 100 (or, particular sound sources 1, 2, 3, etc. in the environmental sound 100) despite variations in characteristics of that environmental sound 100, e.g., SPL variation, frequency variation, etc. In a particular implementation, the controller 30 determines the masking sound to effectively mask at least one sound source (e.g., sound sources 1, 2, 3, etc.) in the environmental sound 100, e.g., across a variation from a SPL and/or frequency that is just audible to the user, up to a user defined and/or preset maximum SPL and/or frequency.

In certain cases, the volume of the masking sound 110 is determined based on a subset of frequencies in the measured environmental sound 100. In further implementations, the content of the masking sound 110 is determined based on a subset of frequencies in the measured environmental sound 100. In still further implementations, the spectrum of the masking sound 110 is determined based on a subset of frequencies in the measured environmental sound 100. In some cases, two or more of the volume, the content, and the spectrum of the masking sound 110 are determined based on a subset of frequencies in the measured environmental sound 100. The subset of frequencies can include certain frequencies or a single frequency in the environmental sound 100. In particular cases, the subset of frequencies is attributed to one or more sound sources (e.g., sound source 1, 2, 3, etc.). In more particular cases, the subset of frequencies is attributed to a salient sound source in the environmental sound 100.

As noted herein, according to certain implementations, the controller 30 is configured to select the volume and/or content of the masking sound 110 to mask acoustic energy of at least one salient sound in the measured environmental sound 100. In particular cases, the volume of the masking sound 110 is selected based on a sound pressure level (SPL) of at least one salient sound source in the measured environmental sound 100. In certain cases, the volume of the masking sound is selected to approximately match or exceed an upper range of the SPL of the salient sound source(s), or the volume of the masking sound is set to a defined level such as a defined value or percentage variation (e.g., +/−X decibels (dB) or +/−Y percent dB) from an upper range of the SPL of the salient sound source(s). In such cases, the SPL of the at least one salient sound is predicted using the measured environmental sound 100 as an input to a model 90 of environmental sound 100.

In various implementations, salient sounds (or salient sound sources) include environmental sounds that are likely to distract or otherwise occupy a user's attention. In particular cases, salient sounds are those environmental sounds that command instantaneous human attention. Examples of salient sounds for significant portions (e.g., a majority or super-majority) of a population can include babies crying (e.g., in a closed environment such as a restaurant, airplane, train, etc.), people talking nearby (e.g., within one to two meters of a user), nearby road noise (e.g., cars traveling on a busy road or high-speed roadway within approximately 100-200 meters of a user), or machine and/or appliance noise such as a high-frequency or low-frequency motor noise. Further description of salient sounds and example sources is included in the paper: "A Novel Auditory Saliency Prediction Model based on Spectrotemporal Modulations" (Soundscape, Psychoacoustics and Urban Environment: Paper ICA2016-791), which is entirety incorporated by reference herein.

In addition to volume (or, SPL) and frequency, controller 30 can also be configured to adjust aspects of the masking sound 110 based on further acoustic characteristics of the environmental sound 100 (or particular sources therein). For example, one or more factors relating to the input signal detected by microphones 70 can be used to determine a masking sound 110, e.g., signal power, sound pressure level (SPL), correlation, delay, frequency response, coherence, acoustic signature (e.g., a combination of SPL and frequency), etc.

Returning to FIG. 3, in a particular implementation, the controller 30 is configured to perform sub-processes in P3 (adjusting a volume and/or content of the masking sound) according to a method including: i) separating environmental sound sources (e.g., Source 1, Source 2, Source 3) in the environmental sound 100, ii) identifying at least one salient sound source in those separated sources (e.g., Source 2), iii) predicting an SPL and/or frequency for the salient sound source(s) using a model of environmental sound (e.g., model 90), and iv) assigning a volume (or, SPL) and/or frequency of the masking sound 110 based on the predicted SPL and/or frequency for the salient sound source(s), e.g., Source 2. In some cases, assigning the volume of the masking sound 110 includes applying a volume margin above the predicted highest SPL, e.g., of several percent or more. In certain aspects (not shown in FIG. 3), the method further includes: v) assigning the content of the masking sound based on the SPL for the at least one salient sound source. In particular cases, the masking sound 110 can include multiple masking sounds, or, layers of masking sounds. For example, a first masking sound can be triggered by certain sound source(s) (e.g., speech), and a second masking sound can be triggered by another source (e.g., coffee machine). In various implementations, the content of the masking sound is based on an upper, lower, or mid-range SPL for the salient sound source, for example, a musical note can be generated at a mid-range or low-range SPL as a masking sound for salient sound sources.

In particular implementations, the sound sources are identified using a source separation model (e.g., in model(s) 90) that accounts for sound spectro-temporal modulations. In certain cases, environmental sound sources can include salient sound, but do not necessarily include salient sound sources. For example, a source separation model can separate environmental sound 100 into different stems, e.g., voice, appliance, ambient, etc., and based on the volume and/or content of the source(s), a volume and/or content of masking sound 110 can be assigned and/or adjusted.

While various examples described herein relate to selecting a masking sound 110 based on SPL and/or frequency characteristics of a salient sound source, additional implementations include selecting a masking sound 110 based on one or more characteristics of the salient sound source. For example, the frequency (in addition to, or alternatively to the volume) of the masking sound 110 can be assigned based on the predicted SPL for the salient sound source(s). Further, the content and/or equalization (EQ) of content in the masking sound 110 can be altered based on the spectrum of predicted salient sound source(s). In still further implementations, a masking model (e.g., in model(s) 90) can be used to determine a preferred spectrum and/or SPL of the masking sound 110.

Figure 4:
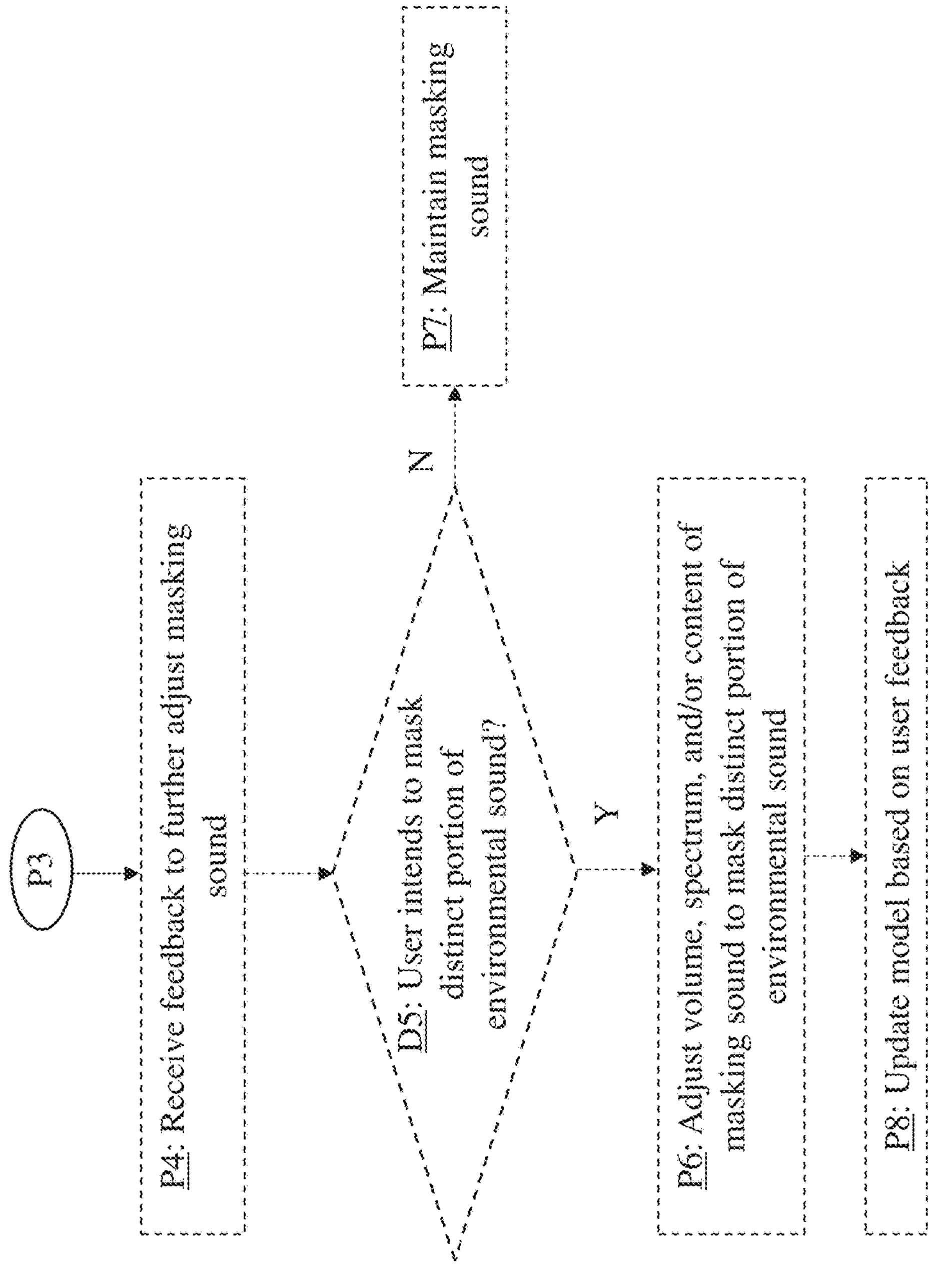
FIG. 4 is a flow diagram illustrating further processes in a method performed according to various implementations.

FIG. 4 shows additional, optional processes in a method (e.g., performed by the controller 30) according to certain implementations. In certain cases, processes P4-P7 are performed subsequently to processes P1-P3 (FIG. 3), but this is not necessary in all implementations. As shown, process P4 includes receiving feedback to further adjust a masking sound 110. In certain cases, the feedback includes a user interface command (e.g., tactile interface command, audio interface command, etc.) to adjust the masking sound 110. For example, feedback can include an interface command to increase the volume of the masking sound 110 or decrease the volume of the masking sound 110. After receiving feedback relating to further adjusting the masking sound 110, controller 30 is configured at decision D5 to determine whether the user intends to mask a distinct portion of the environmental sound 100, e.g., a distinct sound source or a distinct spectrum of sound in the environmental sound 100. If yes (Y), in process P6 the controller 30 adjusts the volume and/or content of the masking sound 110 to mask a distinct portion of the environmental sound 100, e.g., a distinct sound source in the environmental sound 100. If no (N), the controller 30 maintains the masking sound 110 (process P7).

In a further optional process (process (P8)), the controller 30 is configured to update the model of environmental sound (e.g., model(s) 90) based on the user feedback about the masking sound 110. For example, the controller 30 can update the model 90 to correlate acoustic signals received during the feedback input with particular masking sounds, spectrum of masking sounds, etc. In various implementations, the updates to the model 90 are saved for use in future masking mode operation by the user (e.g., at audio device 10) and/or a group of users (e.g., via a cloud accessible model). In some cases, the model 90 is updated using a hysteresis factor that is attributable to the user, or to a group of users. That is, the model 90 can be updated with a user-specific hysteresis factor (e.g., based on prior user adjustments and/or settings such as part of a user profile), or a hysteresis factor attributable to a group of user (e.g., based on prior adjustments for a group of users with similar audio devices).

Figure 5:
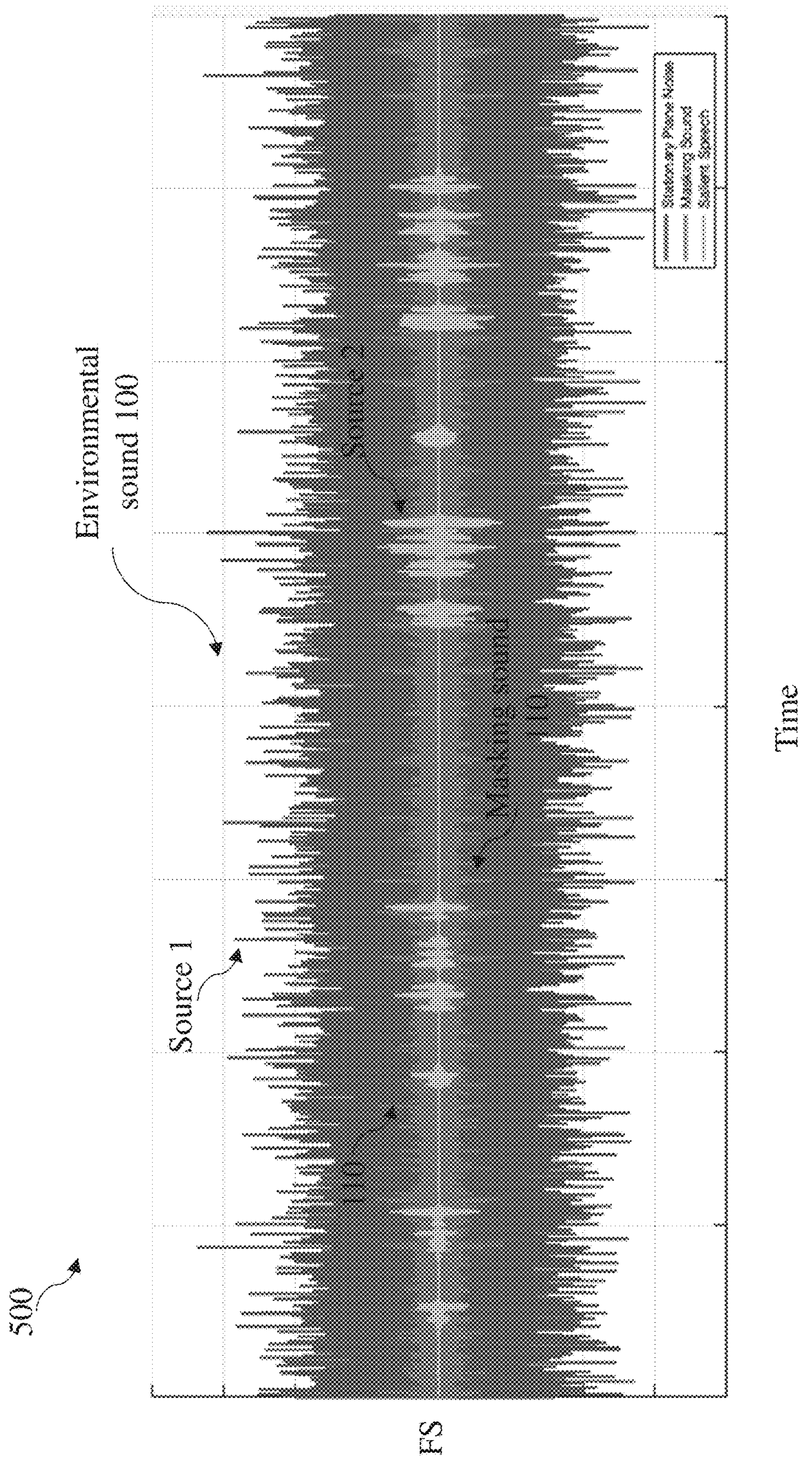
FIG. 5 is a timeseries illustrating aspects of masking environmental sound with an audio device according to various implementations.

As noted herein, various implementations enable output of an environmentally adaptive masking sound. In particular cases, the masking sound is determined to account for variations in environmental sound, such that frequent, small adjustments in the masking sound are not necessary. FIG. 5 illustrates an example time series 500 illustrating frequency (FS) variation over time for two sound sources (e.g., source 1, source 2) in environmental sound 100 proximate to an audio device 10. The time series 500 also illustrates output of a masking sound 110 according to various implementations that is configured to mask one of the sound sources (e.g., source 2). In a particular example, source 1 includes background noise in an environment, e.g., stationary plane cabin noise, and source 2 includes salient sound such as user speech (e.g., a nearby speaker). As is evident from the spectrogram 500, the making sound 110 effectively masks source 2 in the environmental sound 100 without masking the entirety of the environmental sound 100. The masking sound 110 is determined in order to effectively mask variations in source 2 (e.g., with minimal perceptible adjustment in the masking sound 110).

As noted herein, the audio device 10 can include or otherwise be part of a wearable device such as a wearable audio device and/or a wearable smart device. However, the audio device 10 can also include a speaker system that is either not worn by a user or not designed to be worn by a user. In any case, the audio device 10 can beneficially enhance the user experience by providing an environmentally adaptive masking sound. The various implementations disclosed herein can beneficially enhance masking of environmental sound, for example, salient sound in an environment. In particular implementations, the audio device 10 is configured to determine a masking sound (e.g., and acoustic characteristics thereof) to effectively mask salient sound in the environment across a spectrum. In certain of these examples, the use of model(s) 90 enables the audio device 10 to effectively predict variation in salient sounds and assign masking sound(s) accordingly. In any case, the audio device 10 has the technical effect of masking sound such as salient sound sources in environmental sound.

Any of the systems and methods described, and variations thereof, may be implemented with varying levels of reliability based on, e.g., microphone quality, microphone placement, acoustic ports, headphone frame design, threshold values, selection of adaptive, spectral, and other algorithms, weighting factors, window sizes, etc., as well as other criteria that may accommodate varying applications and operational parameters.

It is to be understood that any of the functions of methods and components of systems disclosed herein may be implemented or carried out in a digital signal processor (DSP), a microprocessor, a logic controller, logic circuits, and the like, or any combination of these, and may include analog circuit components and/or other components with respect to any particular implementation. Any suitable hardware and/or software, including firmware and the like, may be configured to carry out or implement components of the aspects and examples disclosed herein.

While the above describes a particular order of operations performed by certain implementations of the invention, it should be understood that such order is illustrative, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, unless otherwise noted, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A method comprising:

measuring environmental sound proximate to an audio device, outputting a masking sound at the audio device, and adjusting at least one of: a volume of the masking sound, a spectrum of the masking sound, or content of the masking sound based on the measured environmental sound, wherein the masking sound is determined to account for variations in the environmental sound, and wherein the masking sound is determined to avoid frequent, minor adjustments in the masking sound based on the variations in environmental sound.

2. The method of claim 1, further including:

determining at least one of the volume of the masking sound, the spectrum of the masking sound, or the content of the masking sound based on a model of environmental sound, identifying a plurality of sources in the environmental sound, predicting a variation in a selected source in the plurality of sources, and selecting the masking sound to effectively mask the selected source without masking an entirety of the environmental sound.

3. The method of claim 2, further including training the model using at least one of a database of environmental sound inputs or a database of instrument and synthesizer sounds, wherein the model is periodically updated based on the measured environmental sound at the audio device.

4. The method of claim 1, wherein at least one of the volume of the masking sound or the content of the masking sound is determined based on a subset of frequencies in the measured environmental sound.

5. The method of claim 1, further including initiating a masking sound mode in response to a trigger prior to outputting the masking sound, wherein after initiating the masking sound mode, the volume of the masking sound, the spectrum of the masking sound, or the content of the masking sound is selected based on the measured environmental sound prior to outputting the masking sound, wherein the trigger includes at least one of: a location-based trigger, a user profile trigger, user actuation at an interface connected with the audio device, detection of an acoustic signature in the environmental sound, proximity between the audio device and another device, or a scheduled time trigger.

6. The method of claim 1, wherein the volume of the masking sound, the spectrum of the masking sound, or the content of the masking sound is selected to mask acoustic energy of at least one salient sound in the measured environmental sound.

7. The method of claim 1, wherein the volume of the masking sound is selected based on a sound pressure level (SPL) of at least one salient sound source in the measured environmental sound.

8. The method of claim 1, wherein the masking sound includes a sound that is intentionally audible to the user, wherein the masking sound is user selectable from a predefined group of masking sounds or is dynamically generated using a masking sound model.

9. An audio device comprising:
- at least one electro-acoustic transducer;
- a set of microphones; and
- a controller coupled with the at least one electro-acoustic transducer and the set of microphones, the controller configured to:
  - measure environmental sound proximate to the audio device,
  - output a masking sound to the at least one electro-acoustic transducer, and
  - adjust at least one of: a volume of the masking sound, a spectrum of the masking sound, or content of the masking sound based on the measured environmental sound,
  - wherein the masking sound is determined to account for variations in the environmental sound, and
  - wherein the masking sound is determined:
    - to avoid frequent, minor adjustments in the masking sound based on the variations in environmental sound, and
    - based on a predicted characteristic of the selected source that is likely to persist over a period of at least several minutes.

10. The audio device of claim 9, wherein the controller is further configured to determine at least one of the volume of the masking sound, the spectrum of the masking sound, or the content of the masking sound based on a model of environmental sound,
- wherein the controller is further configured to train the model using at least one of a database of environmental sound inputs or a database of instrument and synthesizer sounds,
- wherein the model is periodically updated based on the measured environmental sound at the audio device.

11. The audio device of claim 9, wherein the volume of the masking sound and the content of the masking sound are each determined based on a subset of frequencies in the measured environmental sound.

12. The audio device of claim 9, wherein the controller is further configured to initiate a masking sound mode in response to a trigger prior to outputting the masking sound, wherein after initiating the masking sound mode, the volume of the masking sound, the spectrum of the masking sound, or the content of the masking sound is selected based on the measured environmental sound prior to outputting the masking sound, wherein the trigger includes at least one of: a location-based trigger, a user profile trigger, user actuation at an interface connected with the audio device, detection of an acoustic signature in the environmental sound, proximity between the audio device and another device, or a scheduled time trigger.

13. The audio device of claim 9, wherein the volume of the masking sound, the spectrum of the masking sound, or the content of the masking sound is selected to mask acoustic energy of at least one salient sound in the measured environmental sound.

14. The audio device of claim 9, wherein the volume of the masking sound is selected based on a sound pressure level (SPL) of at least one salient sound source in the measured environmental sound, and wherein the masking sound includes a sound that is intentionally audible to the user.

15. The method of claim 2, wherein the variation is predicted using the model of environmental sound, and wherein the selected source includes a salient sound source.

16. The method of claim 15, wherein the masking sound includes a sound that is intentionally audible to the user, wherein the variation includes a frequency variation over time, and wherein at least one characteristic of the masking sound is selected to mask the frequency variation over time as predicted using the model of environmental sound.

17. The method of claim 16, wherein the at least one characteristic includes a plurality of characteristics including a volume of the masking sound and a content of the masking sound.

18. The method of claim 16, wherein the masking sound is determined based on a predicted characteristic of the selected source that is likely to persist over a period of at least several minutes.

19. A method comprising:
- measuring environmental sound proximate to an audio device,
- outputting a masking sound at the audio device, and
- adjusting at least one of: a volume of the masking sound, a spectrum of the masking sound, or content of the masking sound based on the measured environmental sound,
- wherein the masking sound is determined to account for variations in the environmental sound, wherein the masking sound is selected to mask a salient sound source in the environmental sound, and wherein a volume of the masking sound is selected to:
- a) approximately match or exceed an upper range of a sound pressure level (SPL) of a salient sound source in the environmental sound, or
- b) have a defined level including a defined value or a percentage variation from an upper range of the SPL of the salient sound source.

20. The method of claim 4, wherein the content of the masking sound is determined based on the subset of frequencies in the measured environmental sound, wherein the masking sound is a repeating masking sound, and wherein the content of the masking sound is selected using a generative music technique to mitigate detectability of looping artefacts in the repeating masking sound.

21. The method of claim 19, wherein the volume of the masking sound is selected to approximately match or exceed the upper range of the sound pressure level (SPL) of the salient sound source in the environmental sound.

22. The method of claim 19, wherein the volume of the masking sound is selected to have a defined level including a defined value or a percentage variation from an upper range of the SPL of the salient sound source.

* * * * *